(12) United States Patent
Kim et al.

(10) Patent No.: US 10,069,167 B2
(45) Date of Patent: Sep. 4, 2018

(54) ELECTROLYTE FOR RECHARGEABLE LITHIUM BATTERY AND RECHARGEABLE LITHIUM BATTERY

(71) Applicant: SAMSUNG SDI CO., LTD., Yongin-si, Gyeonggi-do (KR)

(72) Inventors: Yun-Hee Kim, Yongin-si (KR);
Ho-Seok Yang, Yongin-si (KR);
Jin-Hyeok Lim, Yongin-si (KR);
Hee-Yeon Hwang, Yongin-si (KR);
Min-Young Lee, Yongin-si (KR);
Se-Jeong Park, Yongin-si (KR);
Min-Seo Kim, Yongin-si (KR);
Hyun-Woo Kim, Yongin-si (KR);
Su-Jeong Koh, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 71 days.

(21) Appl. No.: 15/177,628

(22) Filed: Jun. 9, 2016

(65) Prior Publication Data

US 2017/0069934 A1    Mar. 9, 2017

(30) Foreign Application Priority Data

Sep. 3, 2015    (KR) .................. 10-2015-0125029

(51) Int. Cl.
*H01M 10/0567* (2010.01)
*H01M 10/0525* (2010.01)
*H01M 10/0568* (2010.01)

(52) U.S. Cl.
CPC ... *H01M 10/0567* (2013.01); *H01M 10/0525* (2013.01); *H01M 10/0568* (2013.01); *H01M 2300/004* (2013.01)

(58) Field of Classification Search
CPC ......... H01M 10/0567; H01M 10/0525; H01M 10/0568; H01M 2300/004
See application file for complete search history.

(56) References Cited

U.S. PATENT DOCUMENTS 6,296,973 B1 * 10/2001 Michot ................ C07C 311/48
252/62.2
2009/0181301 A1    7/2009 Kim et al.
(Continued)

FOREIGN PATENT DOCUMENTS

| KR | 10-2009-0063441 A | 6/2009 |
| KR | 10-2014-0063762 A | 5/2014 |
| KR | 10-2014-0127741 A | 11/2014 |
| KR | 10-2015-0011013 A | 1/2015 |

*Primary Examiner* — Alexander Usyatinsky
(74) *Attorney, Agent, or Firm* — Knobbe, Martens, Olson & Bear, LLP

(57) ABSTRACT

An electrolyte for a rechargeable lithium battery includes a non-aqueous organic solvent; a lithium salt; a first compound represented by Chemical Formula 1; and a second compound represented by Chemical Formula 2, wherein an amount of the first compound is about 0.05 wt % to about 10 wt % and an amount of the second compound is about 0.05 wt % to about 10 wt %.

[Chemical Formula 1]

(Continued)

-continued

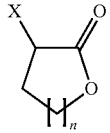

[Chemical Formula 2]

In Chemical Formulae 1 and 2, the substituents are the same as defined in the detailed description.

9 Claims, 8 Drawing Sheets (56) References Cited

U.S. PATENT DOCUMENTS

| | | | |
|---|---|---|---|
| 2011/0128674 A1* | 6/2011 | Michot | C07C 311/48 |
| | | | 361/502 |
| 2013/0316252 A1* | 11/2013 | Lee | H01M 10/056 |
| | | | 429/332 |
| 2013/0337343 A1 | 12/2013 | Tokuda et al. | |
| 2014/0072865 A1* | 3/2014 | Suh | H01M 10/0567 |
| | | | 429/188 |
| 2014/0295288 A1 | 10/2014 | Ding | |
| 2014/0322596 A1 | 10/2014 | Shatunov et al. | |
| 2017/0018803 A1* | 1/2017 | Wang | H01M 10/0567 |

* cited by examiner

ELECTROLYTE FOR RECHARGEABLE LITHIUM BATTERY AND RECHARGEABLE LITHIUM BATTERY

RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2015-0125029 filed in the Korean Intellectual Property Office on Sep. 3, 2015, the disclosure of which is incorporated herein by reference in its entirety.

BACKGROUND

Field

This disclosure relates to an electrolyte for a rechargeable lithium battery and a rechargeable lithium battery including the same are disclosed.

Description of the Related Technology

A rechargeable lithium battery may be recharged and has three or more times higher energy density per unit weight than a conventional lead storage battery, nickel-cadmium battery, nickel hydrogen battery, nickel zinc battery and the like, and may be charged at high rates and thus, is commercially manufactured for a laptop, a cell phone, an electric tool, an electric bike, and the like, and as a result there has been an increase in research activity on enhancing the energy density.

Generally, a rechargeable lithium battery includes a positive electrode, a negative electrode, a separator disposed between the positive electrode and the negative electrode, and an electrolyte.

Recently, as the need for a rechargeable lithium battery having a high energy density has increased, for example, a rechargeable battery for an electric vehicle, as a result research activity for a high voltage positive active material that can improve the energy density via high voltage has also increased. But there has been very little investigation in regards to an electrolyte additive for preventing oxidation of an electrolyte at the interface of an electrolyte with a positive active material.

SUMMARY

One embodiment provides an electrolyte for a rechargeable lithium battery having improved swelling characteristics, retention capacity, and improved swelling characteristics during storage at a high voltage and a high temperature.

Another embodiment provides a rechargeable lithium battery including the electrolyte.

One embodiment provides an electrolyte for a rechargeable lithium battery including a non-aqueous organic solvent; a lithium salt; a first compound represented by Chemical Formula 1; and a second compound represented by Chemical Formula 2, wherein an amount of the first compound is about 0.05 wt % to about 10 wt % and an amount of the second compound is about 0.05 wt % to about 10 wt %.

[CHEMICAL FORMULA 1]

In some embodiments, in the Chemical Formula 1; k, m and n are independently an integer of 0 to 20, and k, m and n are selected to provide an asymmetric structure of Chemical Formula 1. In one embodiment, the k, m and n may be different integers from each other.

In some embodiments, in the Chemical Formula 1; $R^1$, $R^2$, $R^3$, $R^4$, $R^5$, and $R^6$ are each independently hydrogen, a substituted or unsubstituted C1-C30 alkyl group, a substituted or unsubstituted C1-C30 alkoxy group, a halogen, a C1-C5 fluoroalkyl group, a substituted or unsubstituted C2-C30 alkenyl group, a substituted or unsubstituted C6-C30 aryl group, a carbonyl group, or an amine group. In some embodiments, the $R^1$, $R^2$, $R^3$, $R^4$, $R^5$, and $R^6$ may independently be hydrogen, a substituted or unsubstituted C1-C30 alkyl group, a substituted or unsubstituted C1-C30 alkoxy group, or a C1-C5 fluoroalkyl group.

[CHEMICAL FORMULA 2]

In some embodiments, in the Chemical Formula 2; n is an integer of 1 to 3, and X is hydrogen, a halogen, a substituted or unsubstituted C1-C10 alkyl group, or a substituted or unsubstituted C1-C10 alkoxy group.

In some embodiments, an amount of the first compound may be about 0.5 wt % to about 5 wt % based on 100 wt % of the electrolyte for a rechargeable lithium battery. In one embodiment, an amount of the second compound may be about 0.5 wt % to about 5 wt % based on 100 wt % of the electrolyte for a rechargeable lithium battery.

In some embodiments, the first compound may be 1,3,6 or 1,2,6-hexanetricarbonitrile, 1,2,4 or 1,3,5-pentanetricarbonitrile, 2-fluoro or 5-fluoro-hexanetricarbonitrile, or a combination thereof. In some embodiments, the second compound may be γ-butyrolactone, γ-caprolactone, γ-valerolactone, fluoro γ-butyrolactone, or a combination thereof.

In some embodiments, the electrolyte may include at least one additive selected from fluoroethylene carbonate, vinylethylene carbonate, succinonitrile, polysulfone, and a combination thereof.

In some embodiments, the electrolyte may be used in a battery operated at a high voltage of greater than or equal to about 4.35 V.

Some embodiments provide a rechargeable lithium battery including a negative electrode including a negative active material, a positive electrode including a positive active material; and the electrolyte.

Other embodiments are included in the following detailed description.

In some embodiments, a rechargeable lithium battery having high-rate charge and discharge characteristics and cycle-life characteristics may be realized.

DETAILED DESCRIPTION

Hereinafter, embodiments are described in detail. However, these embodiments are exemplary, and this disclosure is not limited thereto.

An electrolyte for a rechargeable lithium battery according to one embodiment includes a non-aqueous organic solvent; a lithium salt; a first compound represented by Chemical Formula 1; and a second compound represented by Chemical Formula 2.

Herein, an amount of the first compound may be about 0.05 wt % to about 10 wt % based on 100 wt % of the electrolyte for a rechargeable lithium battery. When the first compound is included in an amount smaller than about 0.05 wt %, the number of functional groups available for bonding with the positive active material is insufficient, and thus there is deterioration in the suppression of gas generation of the positive electrode during the storage at a high temperature and a thermal impact treatment, while when the first compound is included in an amount larger than about 10 wt %, there is a problem of increasing viscosity and interface resistance and thus preventing improvement in battery performance parameters such as capacity, cycle-life, and the like.

An amount of the second compound may be about 0.05 wt % to about 10 wt % based on 100 wt % of the electrolyte for a rechargeable lithium battery. When the second compound is included in a smaller amount of about 0.05 wt %, there is a deterioration in the swelling characteristics during the storage at a high temperature and a thermal impact treatment, while when the second compound is included in a larger amount of about 10 wt %, there is a problem of increasing interface resistance and thus deteriorating a cycle-life.

In some embodiments, the first and second compounds may be respectively used in an amount of about 0.5 wt % to about 5 wt % based on 100 wt % of the electrolyte for a rechargeable lithium battery, considering maintenance of bulk ion conductivity of the electrolyte itself and lithium ion conductivity at the interface of an active material.

[CHEMICAL FORMULA 1]

In some embodiments, in Chemical Formula 1; k, m and n are independently an integer of 0 to 20, and k, m and n are selected so as to provide an asymmetric structure of Chemical Formula 1. In some embodiments, k, m and n may be different integers from each other.

In some embodiments, in Chemical Formula 1; $R^1$, $R^2$, $R^3$, $R^4$, $R^5$, and $R^6$ may each be independently hydrogen, a substituted or unsubstituted C1-C30 alkyl group, a substituted or unsubstituted C1-C30 alkoxy group, halogen, a C1-C5 fluoroalkyl group, a substituted or unsubstituted C2-C30 alkenyl group, a substituted or unsubstituted C6-C30 aryl group, a carbonyl group, or an amine group. In one embodiment, the $R^1$, $R^2$, $R^3$, $R^4$, $R^5$, and $R^6$ may independently be hydrogen, a substituted or unsubstituted C1-C30 alkyl group, a substituted or unsubstituted C1-C30 alkoxy group, or a C1-C5 fluoroalkyl group.

[CHEMICAL FORMULA 2]

In some embodiments, in Chemical Formula 2; n is an integer of 1 to 3, X is hydrogen, halogen, a substituted or unsubstituted alkyl group, or a substituted or unsubstituted alkoxy group. Herein, the alkyl group may be C1 to C10 alkyl group, C1 to C3 alkyl group or an alkoxy group may be a C1 to C10 alkoxy group or C1 to C3 alkoxy group. The alkyl group may be linear or branched. The substituted alkyl group and the substituted alkoxy group may have a halogen substituent such as fluoro.

In some embodiments, the first compound includes three CN groups as represented by Chemical Formula 1 and thus has much lower bonding energy with metal ions in a battery than a nitrile-based compound including one CN group, two CN groups, or four or more CN groups and thus forms more stable bond with the metal ions, and accordingly, is quite beneficial in decreasing battery thickness during the storage at a high temperature and a thermal impact.

In some embodiments, the first compound may be hexanetricyanide (i.e., 1,3,6 or 1,2,6-hexanetricarbonitrile), pentatricyanide (i.e., 1,2,4 or 1,3,5-pentanetricarbonitrile), fluorohexanetricyanide (i.e., 2-fluoro or 5-fluorohexanetricarbonitrile), or a combination thereof. In some embodiments, the second compound may be γ-butyrolactone, γ-caprolactone, γ-valerolactone, fluoro γ-butyrolactone, or a combination thereof.

The first compound binds very tightly on the surface of a positive active material and hence may form a protective layer that binds tightly to the surface of a positive active material layer. This effectively prevents a direct contact of a positive electrode with the electrolyte. Therefore, it results in reduction of battery expansion due to decomposition of the electrolyte at the positive electrode when stored at a high temperature or due to repeated charging and discharging, both of which result in gas generation. In addition, the first compound may suppress the increase in battery thickness when a thermal impact is applied to a battery and thus improves the durability and safety of a battery to thermal impact.

The second compound forms an oxide film at the positive electrode, effectively suppressing a reaction at the interface of the positive electrode with the electrolyte and in particular the stable oxide film at a high temperature shows an excellent effect of reducing the change in battery thickness due to gas generation at high temperature.

In some embodiments, the first and second compounds may be used in the electrolyte in an amount of about 0.05 wt % to about 10 wt % and it may improve oxidation resistance of the electrolyte, hence it will effectively suppress gas generation on the surface of the positive electrode within a predetermined range, and decrease the change in battery thickness during the storage at a high temperature and a thermal impact, and as a result remarkably improve thermal durability of the battery, compared with an electrolyte using only either the first compound or the second compound.

In some embodiments, the electrolyte may include at least one additive selected from fluoroethylene carbonate, vinylethylene carbonate, succinonitrile, polysulfone and a combination thereof. When these additives are further included, the additives may help formation of a film on a negative electrode as well as the positive electrode and thus efficiently suppress gas generation from the positive and negative electrodes during the storage at a high temperature.

In some embodiments, the additives may be used in an amount of about 0.01 wt % to about 20 wt % based on 100 wt % of the non-aqueous organic solvent. In some embodiments, the additives may be used in an amount of about 0.1 wt % to about 10 wt % based on 100 wt % of the non-aqueous organic solvent. When the additives are used within the range, bulk ion conductivity of the electrolyte and resistance increase of the film may be minimized and thus there is no detrimental effect on the cell performance.

In some embodiments, the electrolyte may be used in a battery operated at a high voltage of greater than or equal to about 4.35 V, particularly greater than or equal to about 4.4V. When a battery operated at a high voltage of greater than or equal to 4.35 V is used, gas is generated by reaction of an active material with an electrolyte, but when the electrolyte includes the first and second compounds of Chemical Formula 1 and Chemical Formula 2 respectively, reaction of the active material with the electrolyte is prevented and hence the gas generation is suppressed even in a high voltage battery.

The non-aqueous organic solvent serves as a medium for transmitting ions taking part in the electrochemical reaction of a battery.

In some embodiments, the non-aqueous organic solvent may include a carbonate-based, ester-based, ether-based, ketone-based, alcohol-based, or aprotic solvent.

In some embodiments, the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. In some embodiments, the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and the like. In some embodiments, the ether-based solvent may include dibutyl ether, tetraglyme, diglyme, dimethoxyethane, 2-methyltetrahydrofuran, tetrahydrofuran, and the like. In some embodiments, the ketone-based solvent may include cyclohexanone and the like. In some embodiments, the alcohol-based solvent include ethyl alcohol, isopropyl alcohol, and the like, and examples of the aprotic solvent include nitriles such as R—CN (where R is a C2 to C20 linear, branched, or cyclic hydrocarbon group that may a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

In some embodiments, the carbonate-based solvent is prepared by mixing a cyclic carbonate and a linear carbonate. The cyclic carbonate and linear carbonate are mixed together in a volume ratio of about 1:1 to about 1:9. When the mixture is used as an electrolyte, it may have enhanced performance.

In some embodiments, the organic solvent may further include an aromatic hydrocarbon-based solvent as well as the carbonate-based solvent. In some embodiments, the carbonate-based solvent and aromatic hydrocarbon-based solvent may be mixed together in a volume ratio of about 1:1 to about 30:1.

In some embodiments, the aromatic hydrocarbon-based organic solvent may be an aromatic hydrocarbon-based compound represented by Chemical Formula 3.

[CHEMICAL FORMULA 3]

In Chemical Formula 3, $R^7$ to $R^{12}$ are the same or different and are selected from hydrogen, a halogen, a C1 to C10 alkyl group, a haloalkyl group, and a combination thereof.

In some embodiments, the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combination thereof.

The electrolyte may further include vinylene carbonate or an ethylene carbonate-based compound represented by Chemical Formula 4 to improve battery cycle life, as an additive for improving cycle life.

[CHEMICAL FORMULA 4]

In Chemical Formula 4, $R^{13}$ and $R^{14}$ are the same or different and are selected from hydrogen, a halogen, a cyano group (CN), a nitro group ($NO_2$), or a C1 to C5 fluoroalkyl group, provided that at least one of $R^{13}$ and $R^{14}$ is a halogen, a cyano group (CN), a nitro group ($NO_2$), or a C1 to C5 fluoroalkyl group, and $R^{13}$ and $R^{14}$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate or fluoroethylene carbonate. The amount of the additive for improving cycle life may be flexibly used within an appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, e.g., an integer of 1 to 20), LiCl, LiI and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

Some embodiments provide a rechargeable lithium battery including a negative electrode including a negative active material, a positive electrode including a positive active material; and the electrolyte.

In some embodiments, the positive electrode may include a current collector and a positive active material layer formed on the current collector.

In some embodiments, the positive active material may include lithiated intercalation compounds that reversibly intercalate and deintercalate lithium ions.

Specifically, at least one composite oxide of lithium and a metal of cobalt, manganese, nickel, or a combination thereof may be used.

Specific examples thereof may be a compound represented by one of chemical formulae.

$Li_aA_{1-b}X_bD^1_2$ ($0.90 \leq a \leq 1.8$, $0 \leq b \leq 0.5$); $Li_aA_{1-b}X_bO_{2-c}D^1_c$ ($0.90 \leq a \leq 1.8$, $0 \leq b \leq 0.5$, $0 \leq c \leq 0.05$); $Li_aE_{1-b}X_bO_{2-c}D^1_c$ ($0 \leq b \leq 0.5$, $0 \leq c \leq 0.05$); $Li_aE_{2-b}X_bO_{4-c}D^1_c$ ($0 \leq b \leq 0.5$, $0 \leq c \leq 0.05$); $Li_aNi_{1-b-c}Co_bX_cD^1_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T^1_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T^1_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD^1_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T^1_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T^1_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$).

In chemical formulae, A is selected from Ni, Co, Mn, and a combination thereof; X is selected from Al, Ni, Co, Mn, Cr, Fe, Mg, Sr, V, a rare earth element, and a combination thereof; $D^1$ is selected from O (oxygen), F (fluorine), S (sulfur), P (phosphorous), and a combination thereof; E is selected from Co, Mn, and a combination thereof; $T^1$ is selected from F (fluorine), S (sulfur), P (phosphorous), and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

In some embodiments, the positive active material may include the positive active material with the coating layer, or a compound of the active material and the active material coated with the coating layer. In some embodiments, the coating layer may include a coating element compound of an oxide of a coating element, hydroxide of a coating element, oxyhydroxide of a coating element, oxycarbonate of a coating element, or hydroxycarbonate of a coating element. In some embodiments, the compound for the coating layer may be either amorphous or crystalline. In some embodiments, the coating element included in the coating layer may be Mg, Al, Co, K, Na, Ca, Si, Ti, V, Sn, Ge, Ga, B (boron), As, Zr, or a mixture thereof. The coating process may include any conventional processes as long as it does not causes any side effects on the properties of the positive active material (e.g., spray coating, immersing), which is well known to persons having ordinary skill in this art, so a detailed description thereof is omitted.

In some embodiments, the positive active material may be $LiCo_{1-x}Mg_xO_2$ having a $TiO_2$ coating layer.

In some embodiments, the amount of the positive active material may be about 90 wt % to about 98 wt % based on the total weight of the positive active material layer.

In some embodiments, the positive active material layer may include a binder and a conductive material. Herein, each amount of the binder and conductive material may be about 1 wt % to about 5 wt % based on the total weight of the positive active material layer.

The binder improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, epoxy resin, nylon, and the like, but are not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be Al, but is not limited thereto.

The negative electrode includes a current collector and a negative active material layer formed on the current collector.

In some embodiments, the negative active material may be a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes carbon materials. The carbon material may be any generally-used carbon-based negative active material in a lithium ion secondary battery. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium include Si, $SiO_x$ ($0<x<2$), a Si-Q alloy (wherein Q is selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, Sn—R alloy (wherein R is an alkali metal, an alkaline-earth metal, a Group 13 element, a Group 14 element, a Group 15 element, a Group 16 element, a transition element, a rare earth element, or a combination thereof, not Sn), and the like. At least one of them may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combination thereof.

The transition metal oxide may be vanadium oxide, lithium vanadium oxide, and the like.

In the negative active material layer, the amount of the negative active material may be about 95 wt % to about 99 wt % based on the total weight of the negative active material layer.

In some embodiments, the negative active material layer may include a binder, and optionally a conductive material. In some embodiments, the binder in the negative active material layer may be about 1 wt % to about 5 wt % based on the total weight of the negative active material layer. In some embodiments, the negative active material layer may include about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder may be a non-water-soluble binder, a water-soluble binder, or a combination thereof.

In some embodiments, the non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamide-imide, polyimide, or a combination thereof.

In some embodiments, the water-soluble binder may be a rubber-based binder or a polymer resin binder. In some embodiments, the rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, ethylenepropylene copolymer, polyethylene oxide, polyvinylpyrrolidone, polyepichlorohydrine, polyphosphazene, polyacrylonitrile, polystyrene, an ethylene propylenediene copolymer, polyvinylpyridine, chlorosulfonated polyethylene, latex, a polyester resin, an acrylic resin, a phenolic resin, an epoxy resin, polyvinylalcohol, and a combination thereof.

When the water-soluble binder is used as the positive electrode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of about 0.1 to about 3 parts by weight based on 100 parts by weight of the negative active material.

The conductive material is included to provide electrode conductivity. Any electrically conductive material may be used as a conductive material unless it causes a chemical change. Examples thereof may be a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like, or a mixture thereof.

The current collector may be selected from a copper foil, a nickel foil, a stainless steel foil, a titanium foil, a nickel foam, a copper foam, a polymer substrate coated with a conductive metal, and a combination thereof.

In some embodiments, the rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 1:
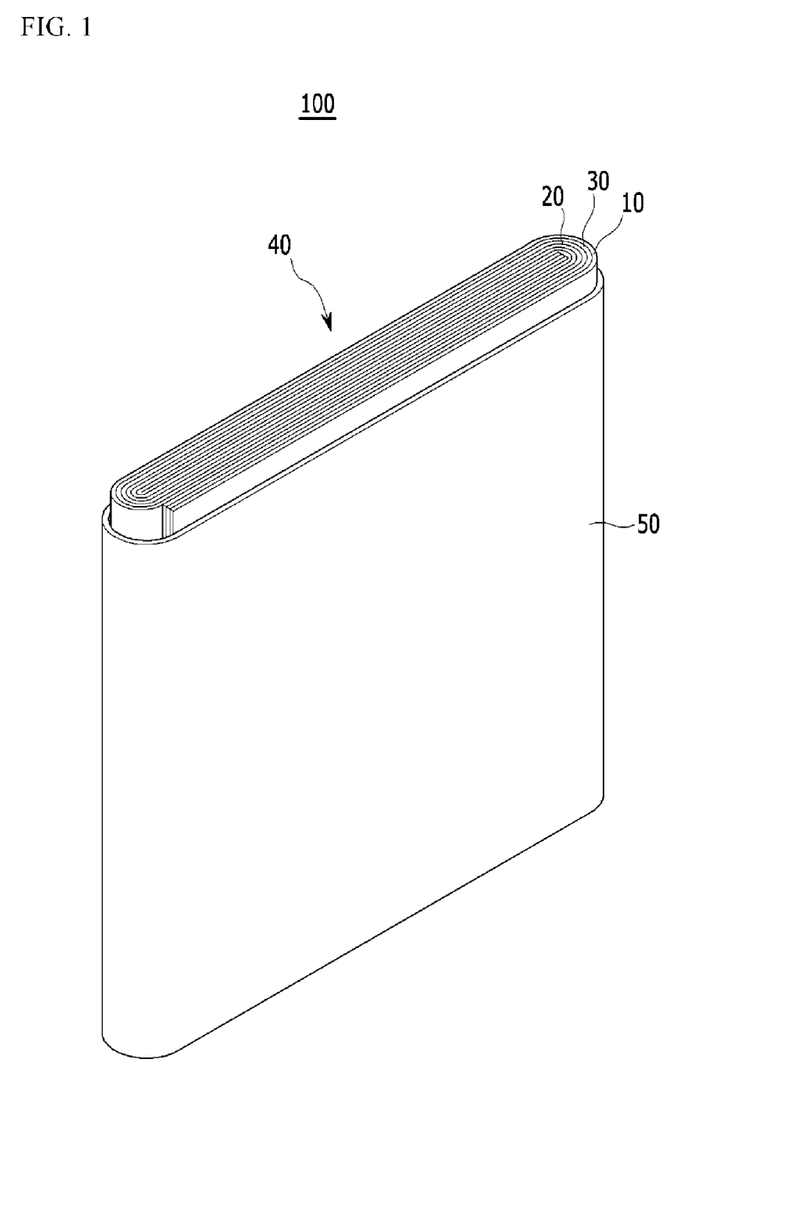
FIG. 1 is a schematic view showing the structure of a rechargeable lithium battery cell according to one embodiment.

FIG. 1 is an exploded perspective view showing a rechargeable lithium battery according to one embodiment. The rechargeable lithium battery according to one embodiment is illustrated to have for example a prismatic shape, but not limited thereto in the present disclosure and may have various shapes such as a cylinder, a pouch, and the like.

Referring to FIG. 1, a rechargeable lithium battery 100 according to one embodiment includes an electrode assembly 40 formed by placing a separator 30 between a positive electrode 10 and a negative electrode 20 and winding the same, and the electrode assembly 40 in a case 50. The electrolyte solution (not shown) is impregnated in the positive electrode 10, the negative electrode 20, and the separator 30.

Hereinafter, examples of the present disclosure and comparative examples are described. These examples, however, are not in any sense to be interpreted as limiting the scope of the disclosure.

EXAMPLE 1

An electrolyte was prepared by mixing ethylene carbonate and ethyl methyl carbonate (3:7 volume ratio) to prepare a non-aqueous organic solvent and dissolving 1.0 M $LiPF_6$, hexane tricyanide (1,3,6 or 1,2,6-Hexanetricarbonitrile) (HTCN), and γ-butyrolactone (GBL) thereto. Herein, the hexane tricyanide and the γ-butyrolactone were used respectively in an amount of 2 wt % and 1.5 wt % based on 100 wt % of the non-aqueous organic solvent.

Positive active material slurry was prepared by missing 90 wt % of $LiCoO_2$, 4 wt % of an acetylene black conductive material, and 6 wt % of a polyvinylidene fluoride binder in N-methyl pyrrolidone solvent.

The positive active material slurry was coated to be 15 μm thick on an Al foil, dried at 100° C., and then, pressed, manufacturing a positive electrode.

Negative active material slurry was prepared by mixing 90 wt % of an artificial graphite negative active material and 10 wt % of a polyvinylidene fluoride binder in an N-methyl pyrrolidone solvent.

The negative active material slurry was coated to be 10 μm thick on a Cu foil, dried at 100° C., and then, pressed, manufacturing a negative electrode.

The electrolyte and the negative and positive electrodes were used to manufacture a 4.4 V-level prismatic rechargeable lithium battery cell.

EXAMPLE 2

An electrolyte was prepared according to the same method as Example 1 except for respectively changing the amounts of hexane tricyanide and γ-butyrolactone into 2 wt % and 3 wt % based on 100 wt % of the non-aqueous organic solvent.

The electrolyte was used with the positive and negative electrodes according to Example 1 to manufacture a rechargeable lithium battery cell.

EXAMPLE 3

An electrolyte was prepared according to the same method as Example 1 except for respectively using the amounts of the hexane tricyanide and the γ-butyrolactone into 2 wt % and 5 wt % based on 100 wt % of the non-aqueous organic solvent.

The electrolyte was used with the positive and negative electrodes according to Example 1 to manufacture a rechargeable lithium battery cell.

COMPARATIVE EXAMPLE 1

An electrolyte was prepared by mixing ethylene carbonate and ethyl methyl carbonate (3:7 volume ratio) to prepare a non-aqueous organic solvent and adding 1.0 M $LiPF_6$ thereto.

The electrolyte was used with the positive and negative electrodes according to Example 1 to manufacture a rechargeable lithium battery cell.

COMPARATIVE EXAMPLE 2

An electrolyte was prepared according to the same method as Example 1 except for respectively using the amounts of the hexane tricyanide and the γ-butyrolactone into 2 wt % and 0 wt % based on 100 wt % of the non-aqueous organic solvent.

The electrolyte was used with the positive and negative electrodes according to Example 1 to manufacture a rechargeable lithium battery cell.

COMPARATIVE EXAMPLE 3

An electrolyte was prepared according to the same method as Example 1 except for respectively using the amounts of the hexane tricyanide and the γ-butyrolactone into 0 wt % and 3 wt % based on 100 wt % of the non-aqueous organic solvent.

The electrolyte was used with the positive and negative electrodes according to Example 1 to manufacture a rechargeable lithium battery cell.

COMPARATIVE EXAMPLE 4

An electrolyte was prepared according to the same method as Example 1 except for respectively using the amounts of the hexane tricyanide and the γ-butyrolactone into 0.04 wt % and 10 wt % based on 100 wt % of the non-aqueous organic solvent.

The electrolyte was used with the positive and negative electrodes according to Example 1 to manufacture a rechargeable lithium battery cell.

COMPARATIVE EXAMPLE 5

An electrolyte was prepared according to the same method as Example 1 except for respectively using the amounts of the hexane tricyanide and the γ-butyrolactone into 2 wt % and 0.04 wt % based on 100 wt % of the non-aqueous organic solvent.

The electrolyte was used with the positive and negative electrodes according to Example 1 to manufacture a rechargeable lithium battery cell.

COMPARATIVE EXAMPLE 6

An electrolyte was prepared according to the same method as Example 1 except for respectively using the amounts of the hexane tricyanide and the γ-butyrolactone into 10.2 wt % and 2 wt % based on 100 wt % of the non-aqueous organic solvent.

The electrolyte was used with the positive and negative electrodes according to Example 1 to manufacture a rechargeable lithium battery cell.

Linear Sweep Voltammetry (LSV)

Anodic Decomposition Characteristics at Room Temperature

Figure 2:
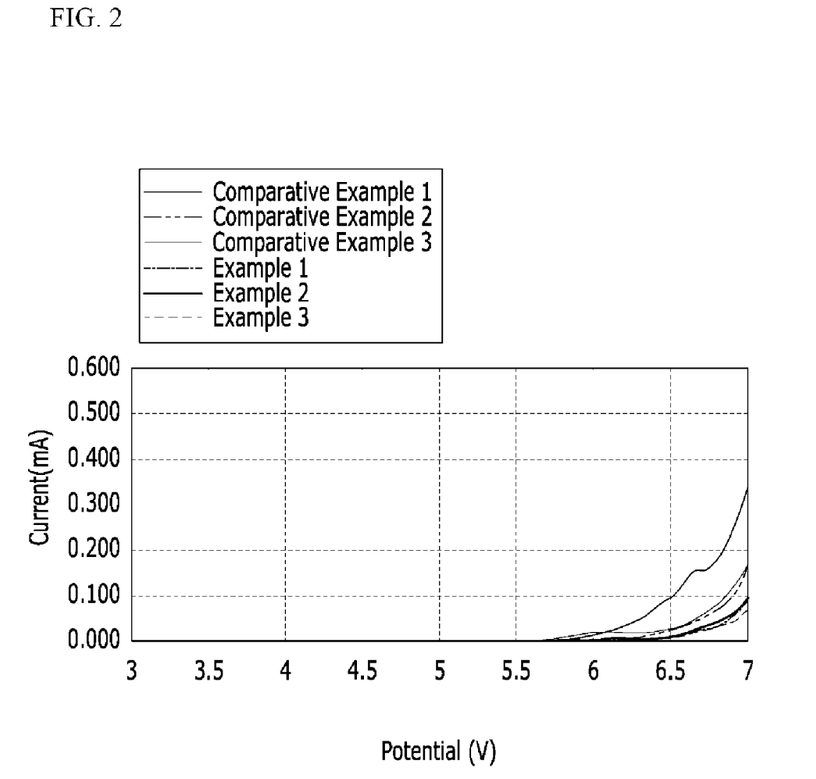
FIG. 2 is a graph showing the LSV (Linear Sweep Voltammetry) results of battery cells according to Examples 1 to 3 and Comparative Examples 1 to 3 at room temperature.

The anodic polarization of each electrolyte according to Examples 1 to 3 and Comparative Examples 1 to 3 at room temperature of 25° C. was measured in a linear sweep voltammetry method using an instrument (Model No. 1480A, Multistat available from Solartron (Leicester, England)) to evaluate its oxidation electrode decomposition characteristics, and the results are provided in FIG. 2. During the measurement, a Pt electrode as a working electrode and Li as a reference electrode and a counter electrode were used to manufacture a three electrode electrochemical cell. Herein, a scan was performed at 3 V to 7 V at a speed of 1.0 mV/sec.

As shown in FIG. 2, the electrolytes including both HTCN and GBL according to Examples 1 to 3 were largely suppressed from an oxidation composition current at a relatively high voltage compared with the electrolyte including only either one of the HTCN or the GBL according to Comparative Examples 1 to 3.

Anodic Decomposition Characteristics at High Temperature

Figure 3:
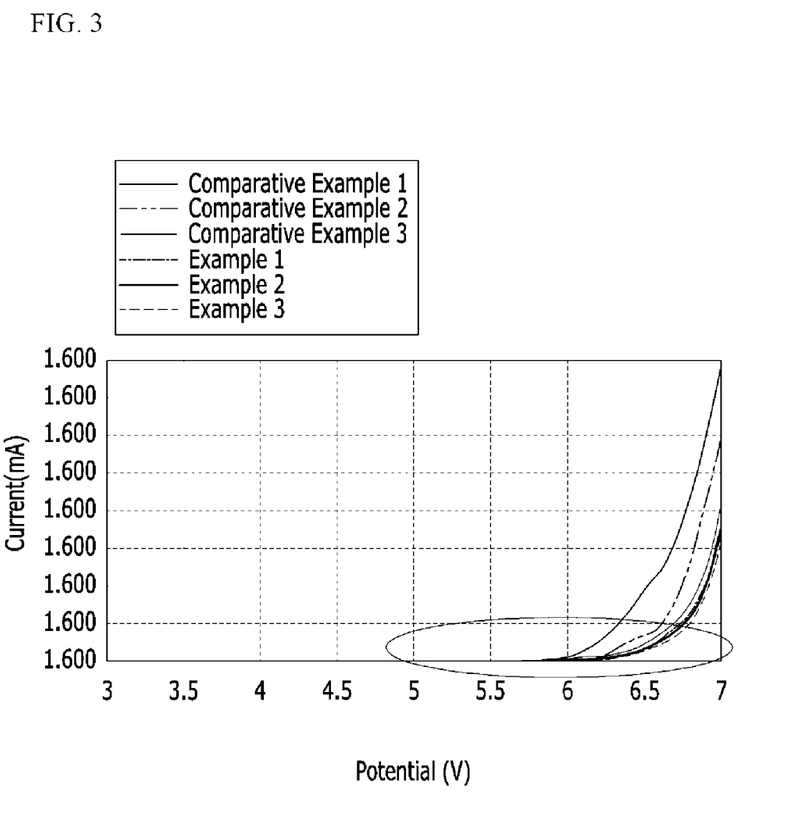
FIG. 3 is a graph showing the LSV (Linear Sweep Voltammetry) results of battery cells according to Examples 1 to 3 and Comparative Examples 1 to 3 at a high temperature.

The anodic polarization of each electrolytes according to Examples 1 to 3 and Comparative Examples 1 to 3 at a high temperature of 60° C. was measured to evaluate its anodic decomposition evaluated, and the results are provided in FIG. 3. In addition, a circled region in FIG. 3 was enlarged and provided in FIG. 4. During the measurement, a Pt electrode as a working electrode and Li as a reference electrode and a counter electrode were used to manufacture a three electrode electrochemical cell. Herein, a scan was performed at 3 V to 7 V at a speed of 1.0 mV/sec.

Figure 4:
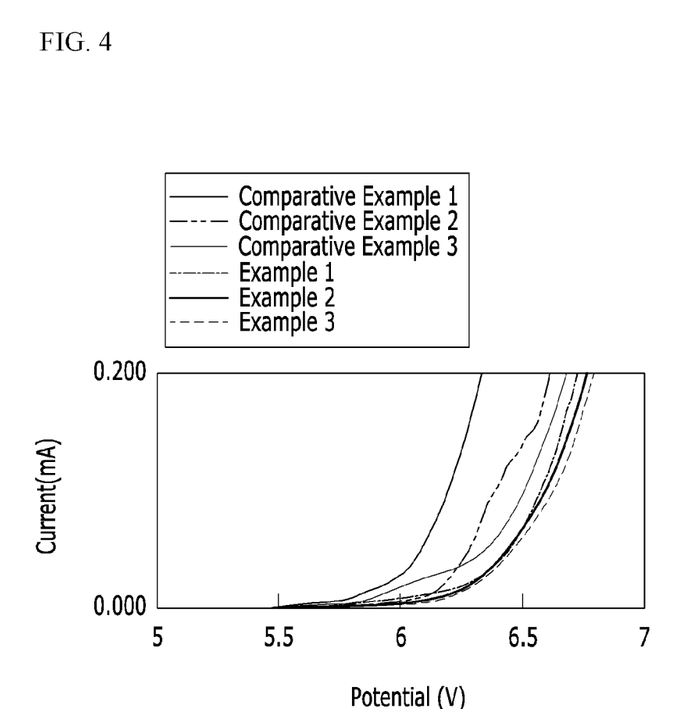
FIG. 4 is a graph enlarging a part of FIG. 3.

As shown in FIGS. 3 and 4, the electrolytes including both HTCN and GBL were largely suppressed from an oxidation decomposition current at relatively high voltage compared with the electrolyte solutions including only either one of the HTCN or the GBL according to Comparative Examples 1 to 3 even at a high temperature of 60° C.

Referring to the results of FIGS. 2, 3, and 4, an electrolyte including both HTCN and GBL showed excellent resistance to oxidation related decomposition compared with an electrolyte using no HTCN and GBL or just one of the HTCN and the GBL and tended to advantageously generate gas due to oxidation decomposition of the electrolyte at a positive electrode when allowed to stand at a high temperature or given by a thermal impact.

Battery Characteristics

Characteristics when being Allowed to Stand at High Temperature

Capacity Retention

Each rechargeable lithium battery cell according to Examples 1 to 3 and Comparative Examples 1 to 3 was once charged at 0.5 C/discharged at 0.2 C, and its initial discharge capacity was provided in Table 1.

The initial charge and discharge capacity was measured using an instrument (Model No. PEBC0505 available from PNE solution (Suwon, Korea)), and then, the rechargeable lithium battery cell was fully-charged under a condition of 0.5 C and 4.4 V and allowed to stand at 60° C. for 4 weeks, once discharged at 0.2 C, and measured the discharge capacity. The results are provided as capacity after being allowed to stand at 60° C. for 4 weeks in Table 1.

A ratio (%) of the discharge capacity after being allowed to stand at 60° C. for 4 weeks relative to initial discharge capacity was calculated and provided as a capacity retention in Table 1.

Thickness Change Rate

Figure 5:
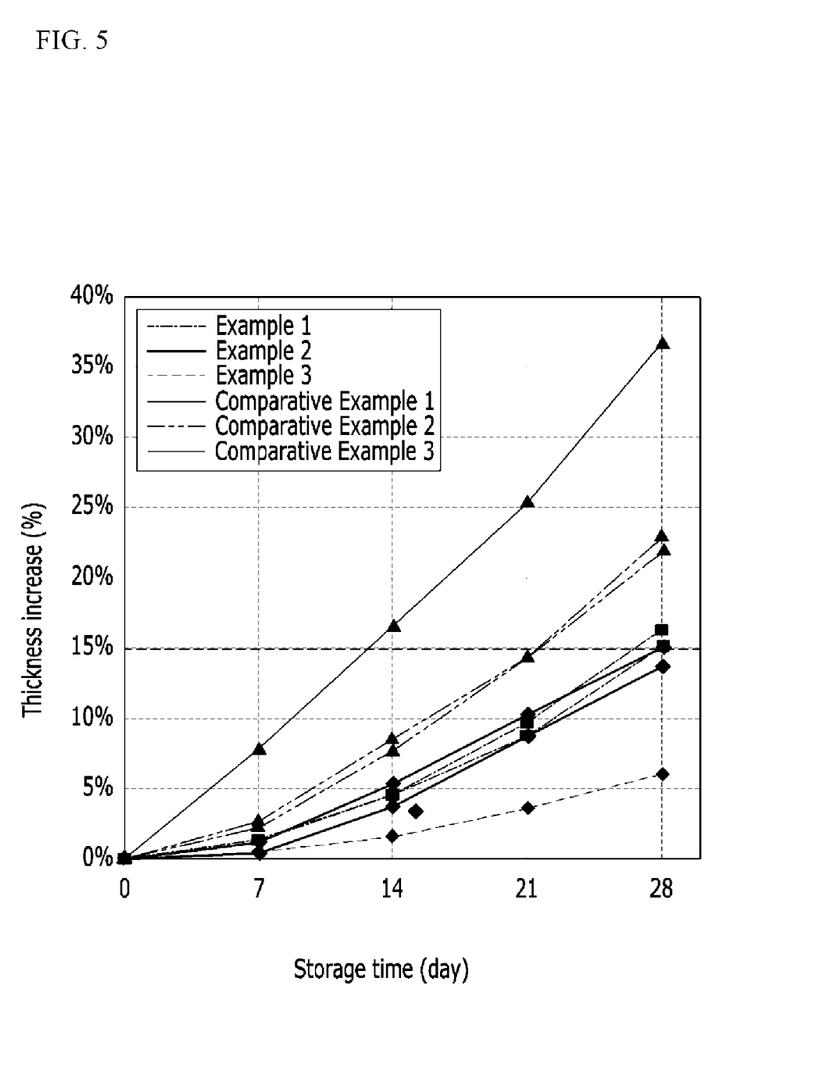
FIG. 5 is a graph showing the thickness increase rates of battery cells according to Examples 1 to 3 and Comparative Examples 1 to 3 when stored at a high temperature.

Each rechargeable lithium battery cell according to Examples 1 to 3 and Comparative Examples 1 to 3 was once initially charged and discharged at 0.5 C/0.2 C, fully-charged under a condition of 0.2 C and 4.4 V and then, measured its initial thickness and then, allowed to stand at 60° C. for 4 weeks and measured the thickness again. The initial thickness, the thickness after allowed to stand at 60° C. for 4 weeks, and a thickness change rate (%) of the initial thickness relative to the thickness increase (the thickness after allowed to stand at 60° C. for 4 weeks—the initial thickness) were provided in Table 1. In addition, the thickness change rate was also provided in FIG. 5. For the rechargeable lithium battery cells in Examples 1 and 2 and Comparative Examples 1 and 2, this test was performed twice, and each of the two results are shown in FIG. 5.

Figure 6:
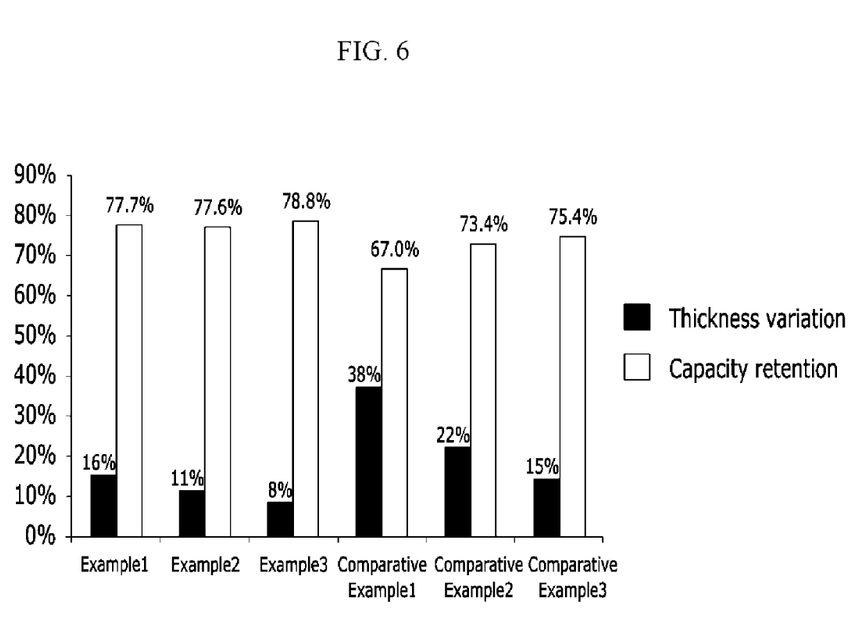
FIG. 6 is a graph showing the thickness increase rates and capacity retentions of the battery cells according to Examples 1 to 3 and Comparative Examples 1 to 3 when stored at a high temperature.

In addition, the capacity retentions and thickness change rates of Examples 1 to 3 and Comparative Examples 1 to 3 out of the capacity retention and thickness change rate results in Table 1 were provided in FIG. 6.

TABLE 1

|  | HTCN (wt %) | GBL (wt %) | Initial capacity (mAh) | Capacity after being allowed to stand at 60° C. for 4 weeks (mAh) | Capacity retention (%) | Initial thickness (μm) | Thickness after being allowed to stand at 60° C. for 4 weeks (μm) | Thickness change rate (%) |
|---|---|---|---|---|---|---|---|---|
| Example 1 | 2 | 1.5 | 2920 | 2270 | 77.7 | 5.28 | 6.10 | 16 |
| Example 2 | 2 | 3 | 2919 | 2265 | 77.6 | 5.23 | 5.82 | 11 |
| Example 3 | 2 | 5 | 2933 | 2310 | 78.8 | 5.22 | 5.66 | 8 |
| Comparative Example 1 | 0 | 0 | 2940 | 1970 | 67.0 | 5.35 | 7.36 | 38 |
| Comparative Example 2 | 2 | 0 | 2931 | 2150 | 73.4 | 5.30 | 6.49 | 22 |
| Comparative Example 3 | 0 | 3 | 2932 | 2210 | 75.4 | 5.29 | 6.06 | 15 |
| Comparative Example 4 | 0.04 | 10 | 2915 | 1980 | 67.9 | 5.25 | 6.80 | 30 |
| Comparative Example 5 | 2 | 0.04 | 2920 | 2180 | 75.7 | 5.29 | 6.47 | 22 |
| Comparative Example 6 | 10.2 | 2 | 2800 | 2000 | 71.4 | 5.30 | 6.38 | 20 |

As shown in Table 1 and FIG. 6, the rechargeable lithium battery cells using the electrolyte including both HTCN and GBL according to Examples 1 to 3 showed high capacity retention at a high temperature compared with the rechargeable lithium battery cells using an electrolyte including no HTCN and GBL or just one of the HTCN and the GBL according to Comparative Examples 1 to 3. In addition, as shown in Table 1 and FIGS. 4 and 5, the rechargeable lithium battery cells using the electrolyte including the HTCN and the GBL according to Examples 1 to 3 were effectively suppressed from a thickness increase after allowed to stand at 60° C. for 4 weeks compared with the rechargeable lithium battery cells using the electrolyte including no HTCN and GBL or just one of the HTCN and the GBL according to Comparative Examples 1 to 3.

Furthermore, the cells including both of the HTCN and the GBL but using them out of the range of 0.05 wt % to 10 wt % according to Comparative Examples 4 to 6 showed deteriorated capacity retention compared with the cells according to Examples 1 to 3 and also, a high thickness increase rate after being allowed to stand at 60° C. for 4 weeks compared with the cells according to Examples 1 to 3.

Analysis of Gas Generated after Allowed to Stand at High Temperature

Figure 7:
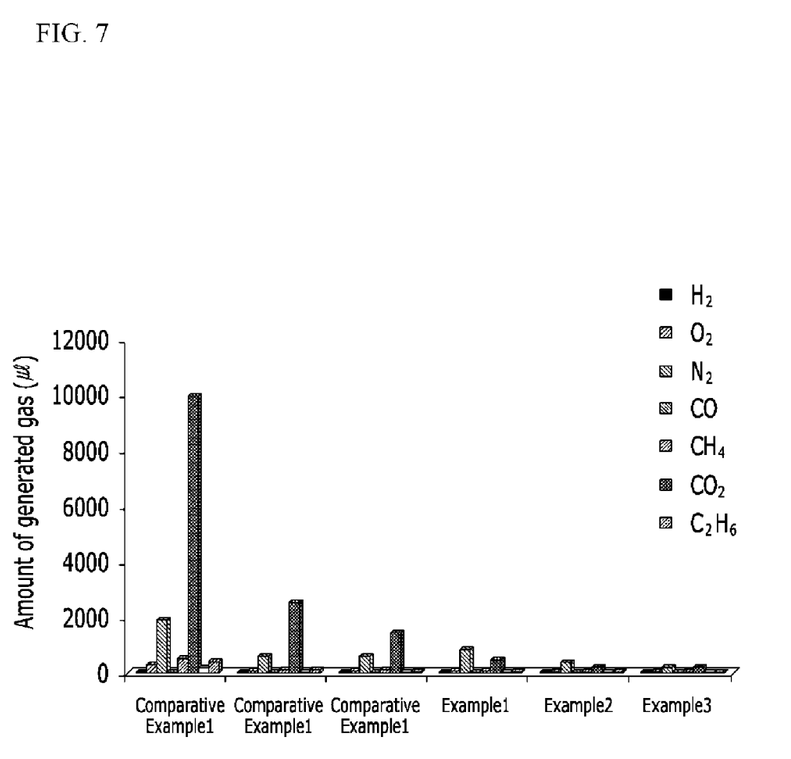
FIG. 7 is a graph showing gas components generated from the rechargeable lithium battery cells according to Examples 1 to 3 and Comparative Examples 1 to 3 when stored at a high temperature.

The electrolytes according to Examples 1 to 3 and Comparative Examples 1 to 3 were allowed to stand at 60° C. for 4 weeks, and then, gas generated therefrom was analyzed regarding its component and amount using an instrument (Model No. GC 6890A available from Agilent Technology (Santa Clara, USA)), and the results are provided in FIG. 7.

As shown in FIG. 7, the electrolytes according to Examples 1 to 3 generated remarkably less $CO_2$ gas mainly due to their oxidation decomposition reaction.

Thermal Impact Experiment

Capacity Retention

The rechargeable lithium battery cells according to Examples 2 to 3 and Comparative Examples 1 to 2 were once charged at 0.5 C/discharged at 0.2 C and measured the initial discharge capacity, and the results are provided in Table 2.

After measuring the initial discharge capacity, the rechargeable lithium battery cells were fully-charged under a condition of 0.5 C and 4.4 V, then, their thermal impact experiments were performed by 20 times repetitively heating up to 85° C. and maintaining them there for 2 hours, then cooling them down, and then maintaining them at −40° C. for 2 hours to give a thermal stress. After the thermal impact experiment, the rechargeable lithium battery cells were once charged at 0.5 C/discharged at 0.2 C and measured the capacity. The results as capacity after thermal impact are provided in Table 2.

A ratio (%) of capacity after the thermal impact relative to the initial capacity is provided in Table 2.

Thickness Change Rate

The initial battery thickness of each rechargeable lithium battery cell according to Examples 1 to 3 and Comparative Examples 1 to 3 before the thermal impact experiment and its battery thickness after the thermal impact experiment were measured. The initial thickness and the thickness after the thermal impact experiment were provided in Table 2, and an increased thickness (thickness after the thermal impact experiment—initial thickness) was provided as a thickness change rate (%) in Table 2.

Figure 8:
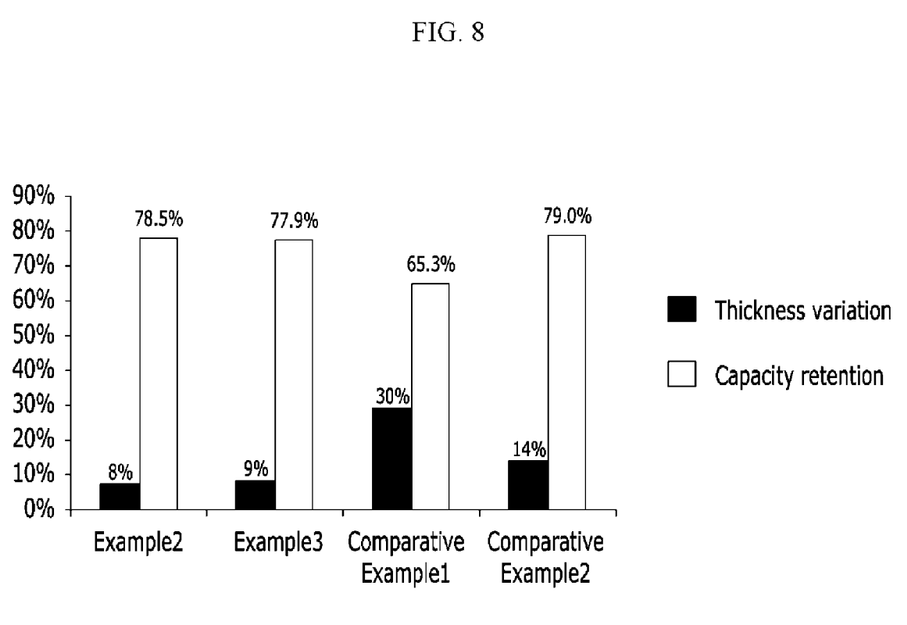
FIG. 8 is a graph showing the thermal impact thickness change rates of the rechargeable lithium battery cells according to Examples 2 and 3 and Comparative Examples 1 to 2.

In addition, the capacity retention and the thickness change rate of the cells were provided in FIG. 8.

TABLE 2

|  | HTCN (wt %) | GBL (wt %) | Initial capacity (mAh) | Capacity after thermal impact (mAh) | Capacity retention (%) | Initial thickness (μm) | Thickness after thermal impact (μm) | Thickness change rate (%) |
|---|---|---|---|---|---|---|---|---|
| Example 2 | 2 | 3 | 2904 | 2280 | 78.5 | 5.25 | 5.65 | 8 |
| Example 3 | 2 | 5 | 2900 | 2260 | 77.9 | 5.22 | 5.67 | 9 |
| Comparative Example 1 | 0 | 0 | 2920 | 1906 | 65.3 | 5.17 | 6.70 | 30 |
| Comparative Example 2 | 2 | 0 | 2910 | 2300 | 79 | 5.21 | 5.96 | 14 |

As shown in Table 2 and FIG. 8, the rechargeable lithium battery cells using the electrolyte including HTCN and GBL according to Examples 2 and 3 showed high capacity retention after a thermal impact experiment and a small thickness change rate after the thermal impact experiment, compared with the rechargeable lithium battery cell using the electrolyte including no HTCN and GBL according to Comparative Example 1 or the rechargeable lithium battery cell using the electrolyte including just only the HTCN according to Comparative Example 2.

While this disclosure has been described in connection with what is presently considered to be practical exemplary embodiments, it is to be understood that the disclosure is not limited to the disclosed embodiments, and is intended to cover various modifications and equivalent arrangements included within the spirit and scope of the appended claims. In the present disclosure, the terms "Example," and "Comparative Example" are used to identify a particular example or experimentation and should not be interpreted as admission of prior art.

What is claimed is:

1. An electrolyte for a rechargeable lithium battery comprising
    a non-aqueous organic solvent;
    a lithium salt;
    a first compound, wherein the first compound is hexanetricyanide, pentatricyanide, fluorohexanetricyanide or a combination thereof; and
    a second compound, wherein the second compound is γ-butyrolactone, γ-caprolactone, γ-valerolactone, fluoro γ-butyrolactone, or a combination thereof,
    wherein an amount of the first compound is about 0.05 wt % to about 10 wt % based on 100 wt % of the electrolyte for the rechargeable lithium battery and
    an amount of the second compound is about 0.05 wt % to about 10 wt % based on 100 wt % of the electrolyte for the rechargeable lithium battery.

2. The electrolyte for a rechargeable lithium battery of claim 1, wherein an amount of the first compound is about 0.5 wt % to about 5 wt % based on 100 wt % of the electrolyte for a rechargeable lithium battery.

3. The electrolyte for a rechargeable lithium battery of claim 1, wherein an amount of the second compound is about 0.5 wt % to about 5 wt % based on 100 wt % of the electrolyte for a rechargeable lithium battery.

4. The electrolyte for a rechargeable lithium battery of claim 1, wherein the electrolyte comprises at least one additive selected from fluoroethylene carbonate, vinylethylene carbonate, succinonitrile, polysulfone, and a combination thereof.

5. The electrolyte for a rechargeable lithium battery of claim 1, wherein the electrolyte is used in a battery operated at a high voltage of greater than or equal to about 4.35 V.

6. A rechargeable lithium battery comprising
a negative electrode including a negative active material,
a positive electrode including a positive active material;
and an electrolyte comprising:
a non-aqueous organic solvent;
a lithium salt;
a first compound, wherein the first compound is hexanetricyanide, pentatricyanide, fluorohexanetricyanide or a combination thereof; and
a second compound, wherein the second compound is γ-butyrolactone, γ-caprolactone, γ-valerolactone, fluoro γ-butyrolactone, or a combination thereof,
wherein an amount of the first compound is about 0.05 wt % to about 10 wt % based on 100 wt % of the electrolyte for the rechargeable lithium battery and
an amount of the second compound is about 0.05 wt % to about 10 wt % based on 100 wt % of the electrolyte for the rechargeable lithium battery.

7. The rechargeable battery of claim 6, wherein an amount of the first compound is about 0.5 wt % to about 5 wt % based on 100 wt % of the electrolyte for a rechargeable lithium battery.

8. The rechargeable battery of claim 6, wherein an amount of the second compound is about 0.5 wt % to about 5 wt % based on 100 wt % of the electrolyte for a rechargeable lithium battery.

9. The rechargeable battery of claim 6, wherein the electrolyte comprises at least one additive selected from fluoroethylene carbonate, vinylethylene carbonate, succinonitrile, polysulfone, and a combination thereof.

* * * * *